Patented May 6, 1952

2,595,327

UNITED STATES PATENT OFFICE 2,595,327

METHOD OF PREPARING $\Delta^{5,7}$-PREGNADIENES

Seymour Bernstein, Pearl River, N. Y., Dominic J. Giancola, Jersey City, N. J., and Karl J. Sax, Pearl River, N. Y., assignors to American Cyanamid Company, New York, N. Y., a corporation of Maine No Drawing. Application February 23, 1951, Serial No. 212,496

6 Claims. (Cl. 260—397.4)

This invention relates to a new method for the preparation of $\Delta^{5,7}$-pregnadiene-3$\beta$-ol-20-one and esters thereof.

The recent medical and chemical literature contains a large number of references to the preparation of steroids having a side chain in the 17-position and keto groups in the 3 and 11-positions. This increased interest was brought about by the discovery that a compound naturally occurring in the adrenal cortex and commonly referred to as cortisone was highly active in the treatment of arthritis, rheumatic fever, severe burns and other pathological conditions. The compound cortisone is described chemically as $\Delta^{4,5}$-3,11,20-triketo-17-alpha-21-dihydroxy pregnene. Other compounds structurally related to cortisone have also been reported as having cortisone-like activity.

In the Journal of Organic Chemistry 13, page 10 (1948), Bergmann and Stevens described several experiments which they carried out on the degradation of ergosterol. When they reacted with ozone the enol acetate of the maleic anhydride adduct of 3$\beta$-acetoxybisnor-5,7-choladien-22-ol (obtained by degradation of the maleic anhydride adduct of ergosteryl acetate), they obtained one of two compounds, either the maleic anhydride adduct of $\Delta^{5,7}$-pregnadiene-3$\beta$-ol-20-one acetate or the maleic anhydride adduct of $\Delta^{5,7}$-androstadiene-3$\beta$-ol-17-one acetate. According to their own statements they believed the compound actually obtained was the latter. However, we have found that they actually produced by the process the first named compound above. The fact that they obtained the $\Delta^{5,7}$-pregnadiene derivative is highly important because of the utility of this compound for further synthesis as it has the same number of carbons in the side chain at the 17-position as cortisone itself.

We have now found that the maleic anhydride adduct of a $\Delta^{5,7}$-pregnadiene-3$\beta$-ol-20-one ester can be pyrolyzed to produce a $\Delta^{5,7}$-pregnadiene-3$\beta$-ol-20-one ester. These latter compounds are useful as intermediates in preparing other pregnenes which may have physiological activity.

The reaction which takes place can be illustrated by the following equation:

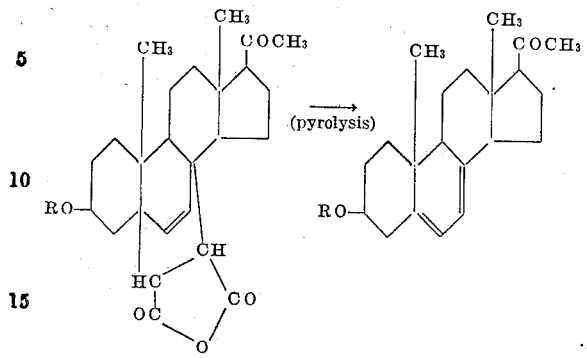

in which R is an ester group.

The compounds of the present invention are prepared by heating a maleic anhydride adduct of $\Delta^{5,7}$-pregnadiene-3$\beta$-ol-20-one ester to a temperature within the range of about 250° C. to about 400° C. On heating the compounds at this temperature the maleic anhydride radical is split off and the pregnadiene is obtained having the double bonds in the 5 and 7-positions. The reaction is usually complete within a period of about one-half hour to about five hours at the above temperature.

While the process of the present invention is preferably carried out using the acetate of maleic anhydride adduct of $\Delta^{5,7}$-pregnadiene-3$\beta$-ol-20-one other esters can be used such as the propionate, butyrate, benzoate, and the like.

The general process is preferably carried out using an ester group in the 3-position. Should the sterol itself be desired it can be obtained by heating the esterified compound with an alkali metal hydroxide or carbonate in a lower aliphatic alcohol.

The compounds of the present invention are useful in the field of pharmaceuticals and may serve as intermediates in the preparation of compounds having cortisone-like activity.

The invention will be described in greater de-

Example 1

A tube containing 500 mg. of maleic anhydride adduct of $\Delta^{5,7}$-pregnadiene-3$\beta$-ol-20-one acetate (prepared as described by Bergmann and Stevens, Journal of Organic Chemistry 13, page 10 (1948)) was heated gradually to about 300° C. at 7 mm. pressure and the sublimate was removed from the tube with benzene and ether. The solvents were removed under reduced pressure and the residue was taken up in ether and filtered. The precipitate consisting of 13 mg. of material having a melting point of 281°–284° C. was apparently starting material. The filtrate, on concentration with methanol, gave 112 mg. of product. Three recrystallizations from methanol gave 38 mg. of pure $\Delta^{5,7}$-pregnadiene-3$\beta$-ol-20-one acetate having a melting point of 165.5°–167.5° C., $\lambda_{maximum}^{absolute\ alcohol}$ 271.5, 282 and 293 m$\mu$.

Example 2

To 15 ml. of methanol was added 13 mg. of the acetate obtained in Example 1 and the mixture treated with 14 mg. of potassium carbonate. The mixture was heated at refluxing temperature in a nitrogen atmosphere for two hours. The product was precipitated with water and was cooled after allowing the mixture to stand overnight. Recrystallization from dilute acetone gave pure $\Delta^{5,7}$-pregnadiene-3$\beta$-ol-20-one having a melting point of 225°–228° C. (dark melt), $\lambda_{maximum}^{1\%\ CHCl_3\ abs.\ alc.}$ 272, 282 and 294 m$\mu$.

Example 3

As proof of the structure of the starting material a mixture of one gram of $\Delta^{5,7}$-pregnadiene-3$\beta$-ol-20-one acetate (prepared as in Example 1), 0.4 g. of maleic anhydride and 50 ml. of xylene was refluxed for 19 hours and then was evaporated under reduced pressure. The residue was heated at 80° C. for one-half hour under reduced pressure for removal of excess maleic anhydride. A slurry with ether was prepared. The solid was removed by filtration and once again treated with ether and filtered. Two recrystallizations from glacial acetic acid gave 0.12 g. of maleic anhydride adduct of $\Delta^{5,7}$-pregnadiene-3$\beta$-ol-20-one acetate, having a melting point of 288°–289.5° C. (yellow melt, gas evolution at melting point). This melting point and other physical and chemical characteristics show that the product obtained is identical with that originally obtained by Bergmann and Stevens.

We claim:

1. A method of preparing compounds of the group consisting of lower alkanoic acid and benzoic acid esters of $\Delta^{5,7}$-pregnadiene-3$\beta$-ol-20-one which comprises heating at a temperature above 250° C. the maleic anhydride adduct of said $\Delta^{5,7}$-pregnadiene-3$\beta$-ol-20-one ester and recovering said compound therefrom.

2. A method of preparing a lower alkanoic acid ester of $\Delta^{5,7}$-pregnadiene-3$\beta$-ol-20-one which comprises heating to a temperature within the range of 250° C. to 400° C. the maleic anhydride adduct of said $\Delta^{5,7}$-pregnadiene-3$\beta$-ol-20-one ester and recovering said compound therefrom.

3. A method of preparing a lower alkanoic acid ester of $\Delta^{5,7}$-pregnadiene-3$\beta$-ol-20-one which comprises heating to a temperature within the range of 250° C. to 400° C. for a period of about one-half hour to about five hours the maleic anhydride adduct of said $\Delta^{5,7}$-pregnadiene-3$\beta$-ol-20-one ester and recovering said compound therefrom.

4. A method of preparing $\Delta^{5,7}$-pregnadiene-3$\beta$-ol-20-one acetate which comprises heating to a temperature of at least 250° C. the maleic anhydride adduct of $\Delta^{5,7}$-pregnadiene-3$\beta$-ol-20-one acetate and recovering said compound therefrom.

5. A method of preparing $\Delta^{5,7}$-pregnadiene-3$\beta$-ol-20-one acetate which comprises heating to a temperature within the range of 250° C. to 400° C. the maleic anhydride adduct of $\Delta^{5,7}$-pregnadiene-3$\beta$-ol-20-one acetate and recovering said compound therefrom.

6. A method of preparing $\Delta^{5,7}$-pregnadiene-3$\beta$-ol-20-one which comprises heating to a temperature of at least 250° C. the maleic anhydride adduct of $\Delta^{5,7}$-pregnadiene-3$\beta$-ol-20-one acetate and subsequently heating the reaction product thereof with an alkali metal carbonate in the presence of a lower aliphatic alcohol and recovering said compound therefrom.

SEYMOUR BERNSTEIN.
DOMINIC J. GIANCOLA.
KARL J. SAX.

No references cited.